United States Patent
Coppola et al.

[11] Patent Number: 5,743,348
[45] Date of Patent: Apr. 28, 1998

[54] SINGLE SPEED TRANSMISSION FOR AN ELECTRIC MOTOR VEHICLE

[75] Inventors: Michael D. Coppola, Auburn; Richard E. Eastman, Central Square; Ronald J. Mayville, Jamesville; Christopher W. Phelan, Chittenango; Michael S. Tianello, Sr., Canastota; Alan P. Zajac, Clay; Sankar K. Mohan, Syracuse, all of N.Y.

[73] Assignee: New Venture Gear, Inc., Troy, Mich.

[21] Appl. No.: 387,461

[22] Filed: Feb. 13, 1995

[51] Int. Cl.[6] .................................................. B60K 1/00
[52] U.S. Cl. .................................. 180/65.6; 74/475
[58] Field of Search .......................... 180/65.1, 65.6, 180/65.7, 65.8, 216, 907; 192/4 A, 48.91; 74/473 R, 335, 575, 577 R, 475; 475/200, 206, 332; 318/265, 266, 286, 466

[56] References Cited

U.S. PATENT DOCUMENTS

| | | |
|---|---|---|
| 1,179,407 | 4/1916 | Decker . |
| 1,323,501 | 12/1919 | Thomas ........................ 475/206 |
| 1,442,220 | 1/1923 | Kelly . |
| 1,794,613 | 3/1931 | Heany . |
| 2,613,781 | 10/1952 | Polomski et al. .............. 192/48.91 |
| 3,861,485 | 1/1975 | Busch . |
| 4,608,885 | 9/1986 | Koivunen ....................... 475/206 |
| 4,610,337 | 9/1986 | Kuwayama et al. ............. 192/4 A |
| 4,645,046 | 2/1987 | Takano et al. ................. 74/475 |
| 4,690,011 | 9/1987 | Sakai et al. ................... 192/4 A |
| 4,704,917 | 11/1987 | Hiroyasu ....................... 74/475 |
| 4,770,062 | 9/1988 | Minegishi . |
| 4,798,103 | 1/1989 | Eastman et al. . |
| 4,836,053 | 6/1989 | Eastman et al. ................ 74/329 |
| 4,918,344 | 4/1990 | Chikamori et al. . |
| 5,076,112 | 12/1991 | Williams ....................... 74/475 |
| 5,100,368 | 3/1992 | Chien . |
| 5,159,847 | 11/1992 | Williams et al. . |
| 5,161,634 | 11/1992 | Ichihara et al. ................ 180/65.8 |
| 5,161,635 | 11/1992 | Kiffe ............................. 180/907 |
| 5,180,959 | 1/1993 | Christopher ................... 218/266 |
| 5,184,050 | 2/1993 | Harada et al. .................. 318/286 |
| 5,289,890 | 3/1994 | Toyoda et al. . |
| 5,295,412 | 3/1994 | Donato et al. . |
| 5,365,804 | 11/1994 | Downs et al. .................. 74/575 |
| 5,396,968 | 3/1995 | Hasebe et al. ................. 180/65.6 |
| 5,427,196 | 6/1995 | Yamaguchi et al. ............ 180/65.6 |

FOREIGN PATENT DOCUMENTS

| | | | |
|---|---|---|---|
| 0123464 | 10/1984 | European Pat. Off. ......... 192/4 A |
| 0571274 A1 | 11/1993 | European Pat. Off. ......... 74/475 |
| 62-20917 | 1/1987 | Japan ........................... 192/48.91 |

*Primary Examiner*—Brian L. Johnson
*Assistant Examiner*—Min Yu
*Attorney, Agent, or Firm*—Harness, Dickey & Pierce, P.L.C.

[57] ABSTRACT

A power transfer system including a variable speed electric motor and a single speed transmission is disclosed for transferring power from a source of power to a pair of driven wheels. This arrangement is particularly adapted for use in electric vehicles incorporating a high speed electric motor. In a preferred embodiment, the single speed transmission includes a housing, an input shaft for receiving drive torque from the electric motor, at least one output shaft and an intermediate shaft supported for rotation of the housing between the input shaft and the output shaft. The single speed transmission further includes a parking sprag arrangement for preventing rotation of the output shaft when a park mode is selected. In one embodiment, the single speed transmission further includes a transfer mechanism for selectively transmitting the source of drive torque from the input shaft to the output shaft which includes a shift member movable between a first position for preventing relative rotation between the input shaft and the output shaft and a second position for establishing relative rotation between the input shaft and output shaft.

23 Claims, 6 Drawing Sheets

SINGLE SPEED TRANSMISSION FOR AN ELECTRIC MOTOR VEHICLE

BACKGROUND OF THE INVENTION

The present invention, in general, relates to a power transfer system for an electric motor vehicle. More particularly, the present invention relates to a power transfer system including a variable speed electric motor and a single speed transmission for transferring torque from the electric motor to driven wheels.

The advantages associated with the utilization of electric power have long been recognized. Heretofore, numerous attempts have been made to incorporate an electrical power source into a commercially viable automotive vehicle. For example, U.S. Pat. No. 1,179,407 issued to Decker in 1916, discloses an electric truck including a transmission having a main shaft, an armature shaft, and an intermediate shaft interdisposed between the main shaft and armature shaft. Two pinion gears are slidably mounted on the main shaft, while a third gear is secured thereon, and four pinion gears are secured to the shaft, one in mesh with the third gear. By sliding the two slidably mounted gears along the main shaft to selectively engage the third gear of the main shaft and three of the four gears of the counter-shaft, low, second, high and reverse speeds are attained.

U.S. Pat. No. 1,442,220 issued to Kelly in 1923, discloses an electric powered automotive vehicle, preferably a truck, including a transmission having parallel motor and rear wheel drive shafts. A pair of gears are keyed to the motor shaft, and a second pair of gears are rotatably mounted on the drive shaft and mesh with the first pair of gears. Clutch means are slidably keyed to the drive shaft intermediate the second pair of gears for establishing two drive speeds by selectively manually engaging the one or the other of the second pair of gears.

U.S. Pat. No. 1,794,613 issued to Heany in 1931, discloses a transmission system for automobiles which includes a combination of electro-magnetic and mechanical clutches arranged with suitable gears as to provide automatic change of speeds. The transmission is operative for manual shifting into various forward and reverse speeds. The transmission includes a main drive shaft, a parallel countershaft and a short shaft supporting an idler gear. Three gears are mounted on a sleeve slidably keyed to the main shaft, and three gears are secured to the countershaft, one of which meshes with the idler gear. Selectively sliding the three sleeve-mounted gears in cooperation with two of the three gears of the countershaft and the idler gear produce low, second, and reverse speed ratios.

U.S. Pat. No. 3,861 issued to Busch in 1975, discloses an electric motor vehicle including an electric motor operably at a generally uniform speed. The electric motor vehicle further includes a two-part transmission having an input shaft connected to the electric motor and an electric clutch shaft. Variable-pitch pulleys on the input shaft and the electric clutch shaft are interconnected by a V-belt. At low speeds, the electric motor is connected through the variable-pitch pulleys and V-belt to the wheels, and for higher speeds the motor is connected thereto through gearing.

While numerous variations of electrical vehicle power transfer systems including the above examples are known, they are primarily directed to designs including multiple speed transmissions adapted to be driven by a single speed electric motor. Most of these prior designs are of complex construction and uncertain reliability. Thus, the need exists to develop a reliable power transfer system for an electric vehicle incorporating a variable speed electric motor and a single speed transmission.

SUMMARY OF THE INVENTION

Accordingly, it is therefore an object of the present invention to overcome the disadvantages associated with previously known power transfer systems for electric vehicles by providing a power transfer system having a variable speed electric motor and a single speed transmission.

Pursuant to a related object of the present invention, the power transfer system is operably installed between the driven wheels and the power source of an electric motor vehicle and is adapted to deliver torque therebetween. In a preferred form, the power transfer system includes a variable speed electric motor and a single speed transmission. The single speed transmission includes a housing, an input shaft rotatably mounted in the, housing for receiving drive torque from the variable speed electric motor, and at least one output shaft. In the preferred embodiment, the single speed transmission includes first and second axle shafts and an intermediate shaft which is supported for rotation in the housing between the input shaft and the first and second axial shafts. Further, the intermediate shaft is operatively interconnected to the first and second axle shifts through a differential assembly.

The power transfer system further preferably includes a drive mechanism mounted in the housing for movement between a park position, a drive position, a neutral position and a reverse position. The preferred embodiment further includes a gear selector shifter and a sensor. The gear selector shifter enables a vehicle operator to select one of a park mode, reverse mode, neutral mode, and drive mode. The sensor is operative for sensing the position of the drive member and generating a mode select signal indicia thereof for ultimately controlling the variable speed electric motor.

According to a further defined embodiment, a power transfer system is provided which is substantially similar to the previously described embodiment and additionally incorporates a transfer mechanism for selectively transmitting a source of drive torque from the input shaft to the first and second axle shafts. The transfer mechanism preferably includes a shift member movable between a first position for disengaging the input shaft from the first and second axle shafts and preventing relative rotation therebetween, and a second position engaging the input shaft with the first and second axle shafts for permitting relative rotation therebetween. In this further defined embodiment, the transfer mechanism preferably includes a shift sleeve mounted free to rotate on the intermediate shaft. The shift sleeve is actually movable on the intermediate shaft between the first position and the second position. Additionally, this further defined embodiment includes cooperating means for cooperating movement of the shift sleeve between the first and second positions in response to movement of a drive mechanism.

BRIEF DESCRIPTION OF THE DRAWINGS

Further objects, features and advantages of the present invention will become apparent from analysis of the following written specification and the accompanying drawing and the appended claims in which:

DETAILED DESCRIPTION OF THE PREFERRED EMBODIMENT

The present invention is directed to a power transfer system which is adapted to be operably installed between the power source and the driven wheels of a motor vehicle. More particularly, the power transfer mechanism of the present invention is of the type including a single speed transmission and specifically adapted for use in electric vehicles for delivering a source of torque from a variable speed electric motor to the driven wheels.

Certain terminology is used in the following description for convenience only and is not intended to be limiting. The words "clockwise" and "counterclockwise" designate directions in the drawings to which reference is being made. Also in the drawings, where similar reference characters designate like parts throughout the several views, illustrated are preferred embodiments of the present invention.

Figure 1:
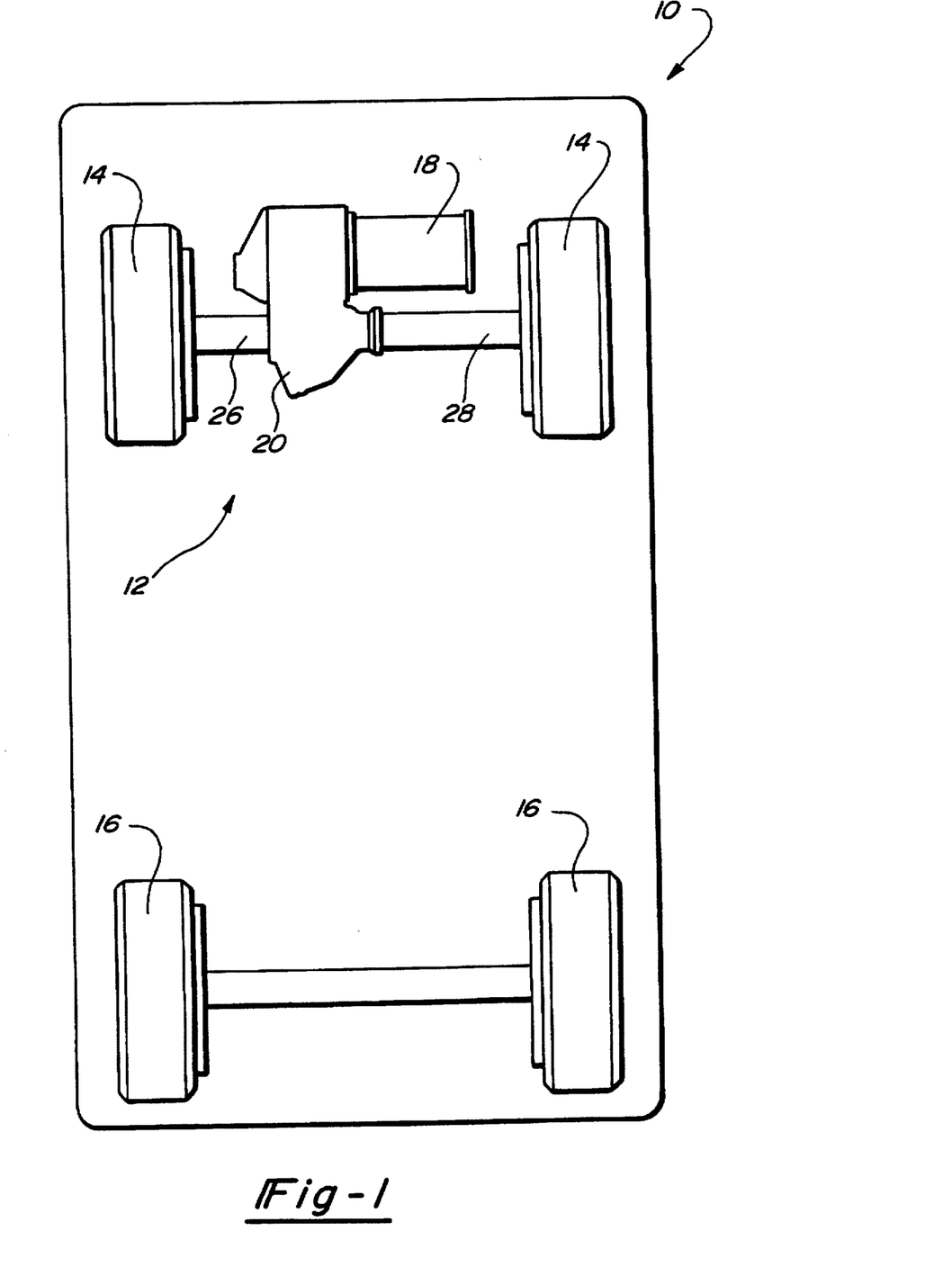
FIG. 1 is a schematic illustration of an electric motor vehicle equipped with a power transfer system constructed in accordance with the teachings of a first preferred embodiment of the present invention to include a variable speed electric motor and a single speed transmission.

Referring to FIG. 1 of the drawings, a drivetrain for an electric motor vehicle 10 is schematically shown interactively associated with a power transfer system 12 which incorporates the novel principles of the present invention. The electric motor vehicle drivetrain has a pair of front wheels 14 and a pair of rear wheels 16, at least one of which is driven by a power source, such as an electric motor.

In the particular embodiment illustrated, power transfer system 12 is for a front wheel drive system and preferably incorporates a power source 18 and a single speed transmission 20. Single speed transmission 20 is shown to include a differential 22 which cooperates to transfer drive torque from power source 18 to the vehicle front wheels 14 (i.e., the "driven" wheels) for a two-wheel mode of operation. The vehicle front wheels 14 are shown connected to single speed transmission 20 through a left axle shaft 26 and a right axle shaft 28, respectively. However, it will readily be understood by those skilled in the art that the specific orientation of the drivetrain is merely exemplary in nature and that the drivetrain could be reversed for normally driving the vehicle rear wheels 16. It will also be understood that the drivetrain could be modified to selectively deliver torque to the all four wheels during a four-wheel drive mode.

In the preferred embodiment, power source 18 is a high speed electric motor. Electric motor 113 is conventional in construction and includes an internally splined rotor (not shown) mounted therein for rotation. Electric motor 18 is preferably operable for generating variable output speeds between approximately zero (0) and 12,000 rpm in response to selective actuation of a throttle (not shown). The internally splined rotor of electric motor 18 is operable for rotation in a first direction for forwardly propelling vehicle 10 and a second direction for rearwardly propelling vehicle 10.

With particular reference to FIGS. 2 through 6, the structure for the single speed transmission 20 shown schematically in FIG. 1 will now be described in detail. Single speed transmission 20 includes a housing 30 formed by a series of modular sections that are suitably interconnected in a conventional manner. More particularly, housing 30 includes a left hand housing portion 32 and a right hand housing portion 34. Right hand housing portion 34 includes a circumferential wall 36 and an end wall 38. Left hand housing portion 32 cooperates with right hand housing portion 34 to define a gear chamber 40, a connecting chamber 42 and a differential chamber 44. As shown in FIG. 1, housing 30 further includes a cover 46 adapted to conventionally attach to a portion of left hand housing portion 32 and conceal a parking sprag gear 48 of a parking sprag arrangement. Sprag gear 48 and the parking sprag arrangement will be discussed in detail below.

Figure 2:
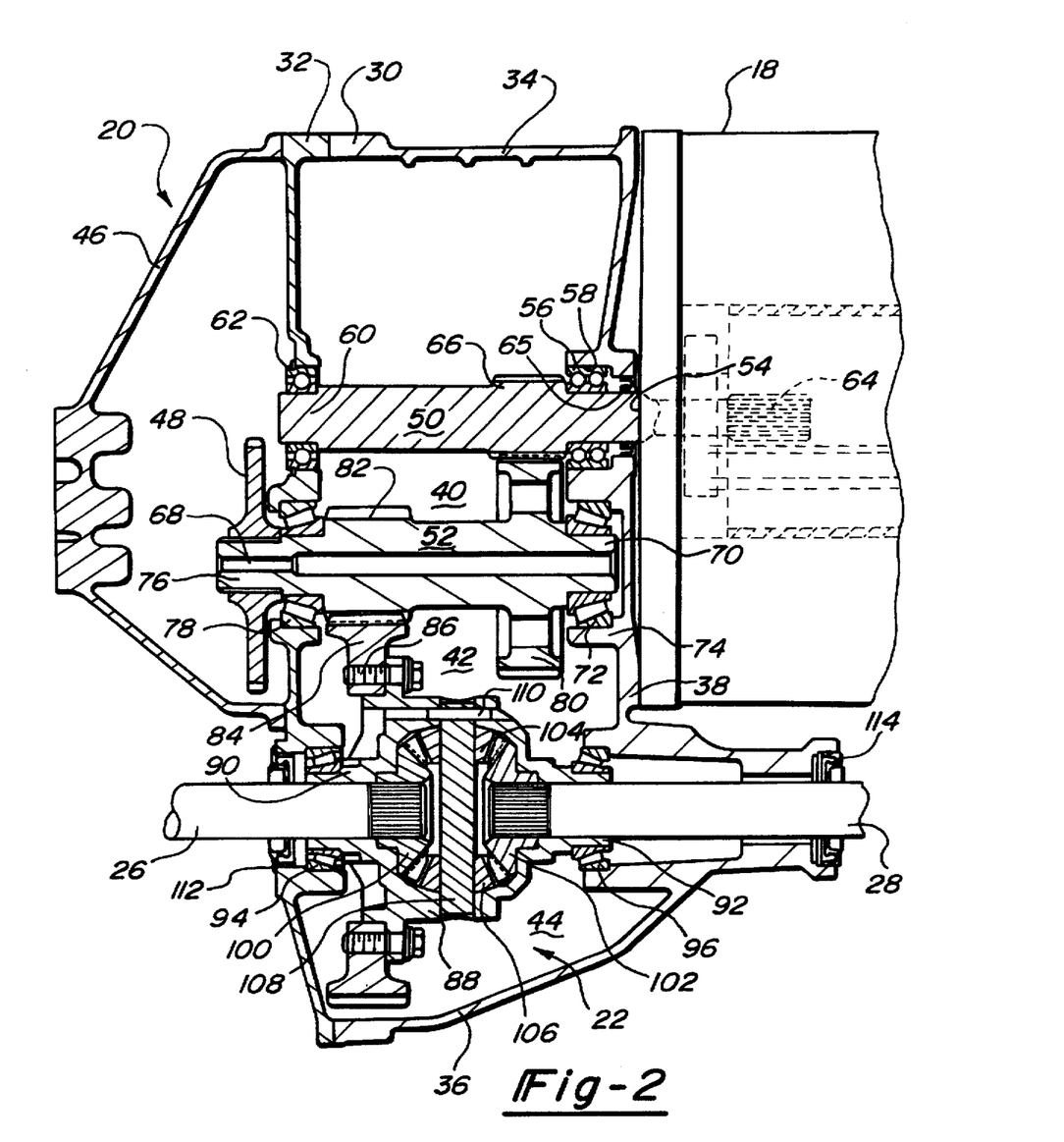
FIG. 2 is a developed sectional view of the single speed transmission of FIG. 1 shown in operative cooperation with an electric motor.

Single speed transmission 20 includes a first shaft member 50 and a second shaft member 52. Preferably, the first shaft member comprises an input shaft 50 and the second shaft member comprises an intermediate shaft 52. Input shaft 50 and intermediate shaft 52 are rotatably supported in spaced parallel relationship to each other in housing 30. More specifically, input shaft 50 is rotatably supported in housing 36 at a first end 54 by a double bearing assembly 56. Double bearing assembly 56 is mounted in an inwardly extending circumferential flange portion 58 of end wall 38. At a second end 60, input shaft 50 is rotatably supported by a single bearing assembly 62 mounted within an aperture passing through left hand housing portion 32. First end 54 of input shaft 50 extends through an aperture disposed adjacent inwardly extending flange 58 and is formed to include external splines 64 (shown in phantom) adapted to engage the internally splined rotor of electric motor 18. A seal 65, which is preferably constructed from a fluroelastomeric material capable of accommodating input shaft speeds of 12,000 rpm, rotatably interfaces between end portion 54 and input shaft 52. Input shaft 50 is also formed to include an input gear 66.

Double bearing assembly 56 provides increased stiffness to input shaft 50. The increased stiffness resultantly decreases the degree of deflection of input shaft 50 and thereby enables the gearing of single speed transmission 20 to mesh more completely. This is particularly important where electric motor 18 is operated at higher motor speeds. Complete meshing of the gearing contributes to a quieter operation of single speed transmission 20—a feature of critical importance for electric vehicles 10 which do not operate under the noise associated with internal combustion engines.

In the exemplary embodiment shown, intermediate shaft 52 is a sleeve shaft having a central bore 68 therethrough. Intermediate shaft 52 is rotatably supported at a first end 70 by a bearing 72 mounted in a cylindrical flange 74 extending from end wall 38. Adjacent a second end 76, intermediate shaft 52 is rotatably supported by a bearing 78 mounted in an aperture passing through left hand housing portion 32. Bearings 72 and 78 supporting intermediate shaft 52 are preferably tapered roller bearings secured by a cross-fit in the associated housing portion on intermediate shaft 52.

Adjacent first end 70, intermediate shaft 52 includes an intermediate gear 80 fixed thereto for rotation. Intermediate gear 80 is in constant meshing relationship with input gear 66 formed on input shaft 50. An output drive gear 82 is integrally formed on intermediate shaft 52 adjacent second end 76. As will be appreciated more fully below, output drive gear 82 is adapted to transfer torque from intermediate shaft 52 to a differential gear 84 associated with differential 22. Second end 76 of intermediate shaft 52 extends through aperture formed in left hand housing portion 32 and is fixed for rotation (i.e., splined) to sprag gear 48.

Differential 22 is of conventional construction and need not be described in significant detail. Briefly, differential 22 includes differential gear 84. The differential gear 84 is in constant meshing relation with output drive gear 82. Differential gear 84 is secured by a fastener 86 to a differential cage 88. Output drive gear 82 and differential gear 84 are preferably helical gears and extend through connecting chamber 42. Differential cage 88 has on the differential gear side and on the other side, respectively, integral sleeves 90 and 92. Integral sleeves 90 and 92 are rotatably supported by tapered roller bearings 94 and 96, respectively. First and second output members, which in the preferred embodiment respectfully comprise first and second axle shafts 26 and 28, are; rotatably supported in integral sleeves 90 and 92 and fixed by splines to bevel gears 100 and 102. Bevel gears 100 and 102 mesh with differential pinions 104 and 106, both mounted on a pinion shaft 108 secured in a cross-bore 110. Pinion shaft 108 is secured in differential cage 88 by a pin 112. Thrust washers (not shown) are preferably located between each pinion 104 and 106 and differential cage 88. Seals 112 and 114 rotatably interface between axle shafts 26 and 28 and housing 30 and are preferably constructed from an ethylene acrylic material.

According to one embodiment of the present invention, the gear ratio of input gear 66 and intermediate gear 80 is approximately 3.04 to 1. The gear ratio of output drive gear 82 and differential gear 84 is approximately 3.77 to 1. Thus, the single speed transmission 20 has a predetermined overall gear ratio of approximately 11.46 to 1. Thus, when electric motor 18 provides a 12,000 rpm input to input shaft 50, the speed of intermediate shaft 52 is on the order of 3,950 rpm and the resultant speed of left and right axle shafts 26, 28 is on the order of 1,050 rpm.

Figure 3:
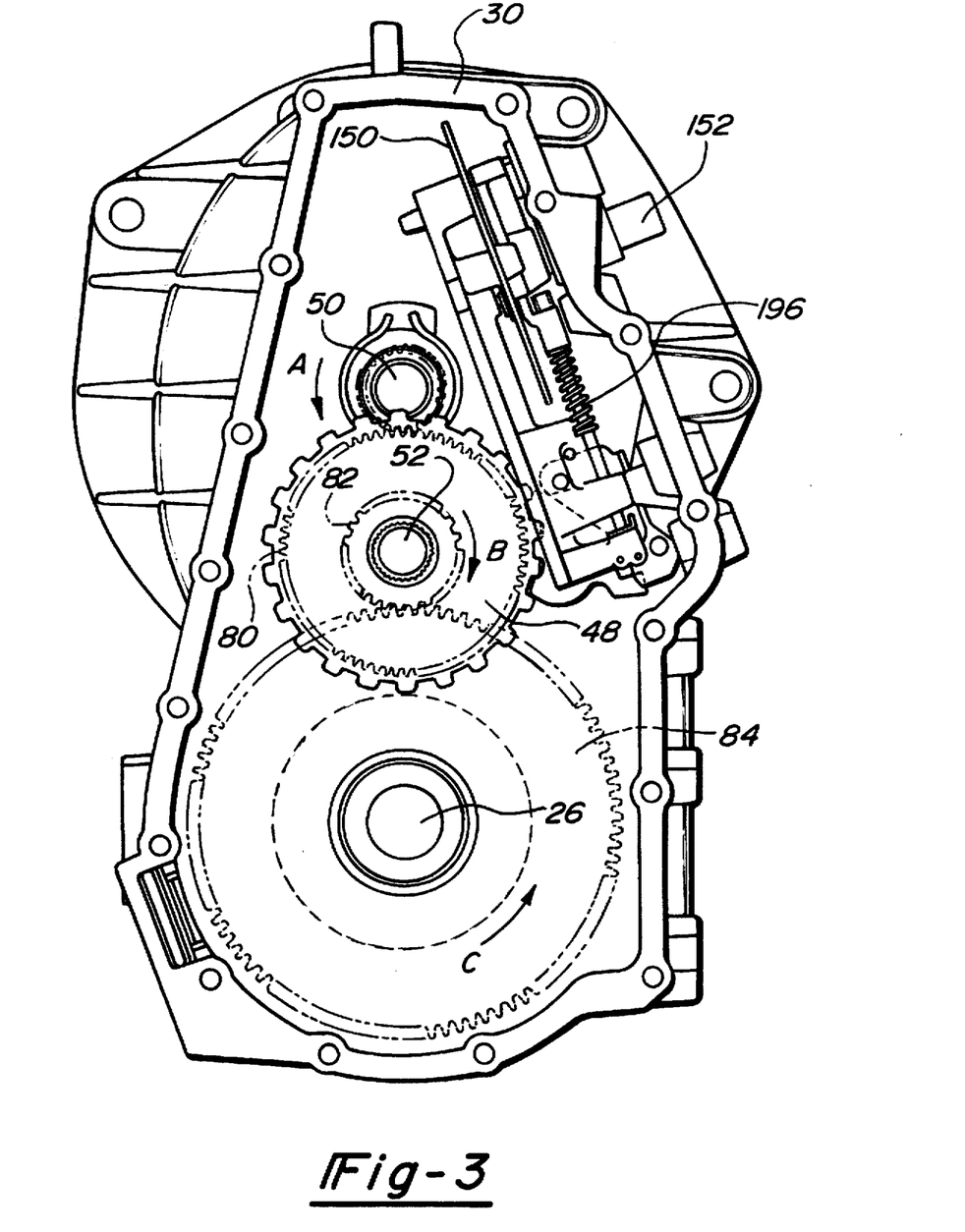
FIG. 3 is an end view of the single speed transmission of FIG. 1 illustrated with the cover and left hand housing removed for enhanced clarity of illustration.
Figure 4:
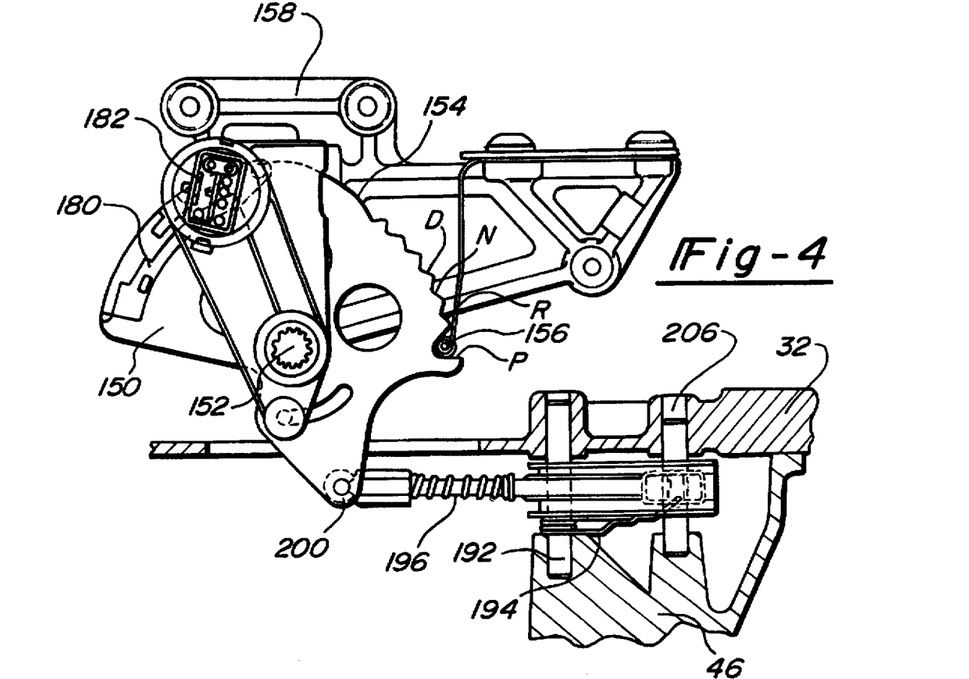
FIG. 4 is an enlarged side view illustrating in greater detail the parking sprag assembly of FIG. 1.

With particular reference to FIGS. 3-7, a mechanical shift arrangement of the present invention will be described in detail. The shift arrangement includes a drive mechanism 150 mounted in housing 30 for movement between a park position, a drive position, a neutral position and a reverse position. Drive mechanism preferably comprises a sector plate 150 splined to a gear select shaft 152. Sector plate 150 is rotatable about an axis defined by gear select shaft 152 through one of four operating positions—park, reverse, neutral and drive. Sector plate 150 includes an arcuate edge 154 having stepped locating positions corresponding with each of the four operating positions. The stepped locating positions, which are identified in FIG. 4 as P (park), R (reverse), N (neutral), and D (drive), selectively provide positive location in one of the four operating modes of single speed transmission 20. Positive location of one of the positions of sector plate 150 is obtained by a spring loaded roller detent 156 attached to a shift plate mechanism 158 for engaging one of the stepped locating positions, P, R, N and D. Spring roller detent 156 is shown in FIG. 4 providing positive location of sector plate 150 in the park position, P.

Figure 6:
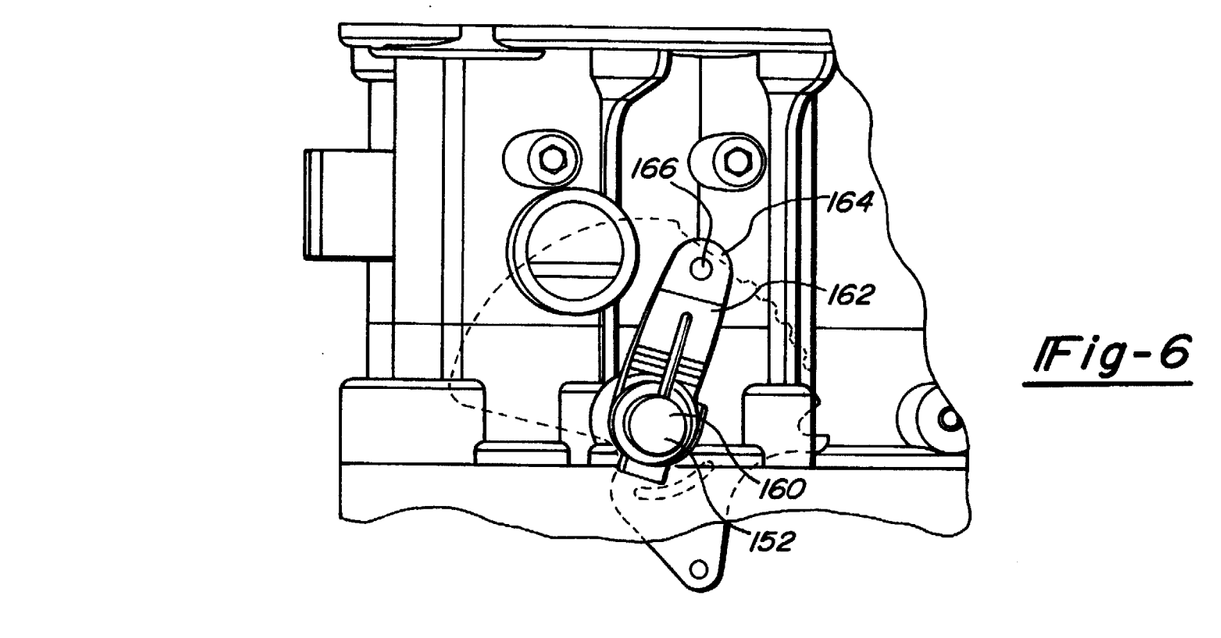
FIG. 6 is a side view illustrating in greater detail the control mechanism for the parking sprag assembly.
Figure 7:
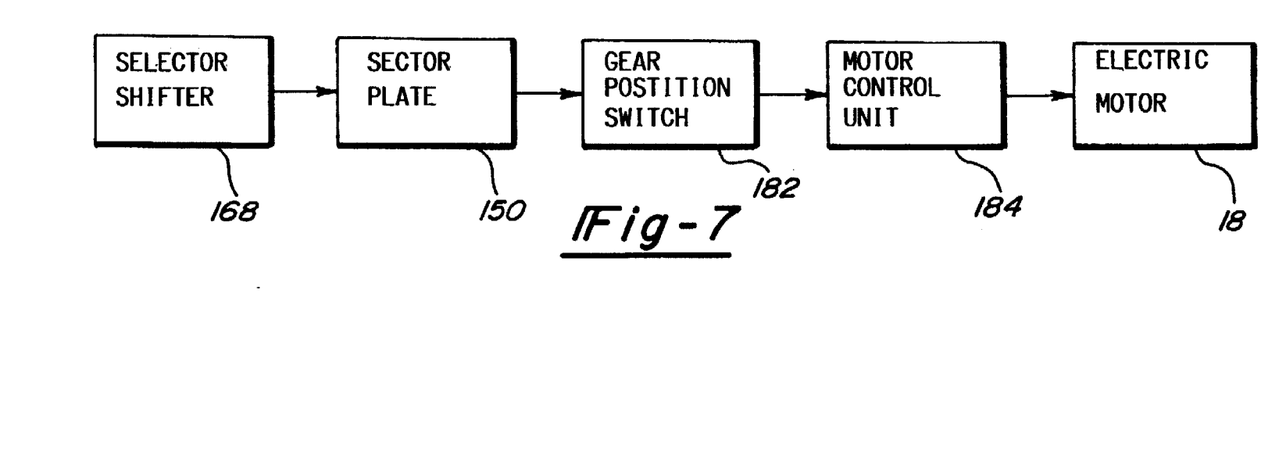
FIG. 7 is a block diagram of the control system of power transfer system of the present invention.

Referring to FIGS. 6 and 7, the present invention is shown to further include mode select means for enabling a vehicle operator to select one of a park mode, reverse mode, neutral mode, and reverse mode. The mode select means is operative to cause selective movement of sector plate 150 such that sector plate 150 moves to the park position when the park mode is selected, sector plate 150 moves to the drive position when the drive mode is selected, sector plate 150 moves to the neutral position when the neutral mode is selected, and sector plate 150 moves to the reverse position when the reverse mode is selected. In the preferred embodiment, the mode select means comprises a selectively movable element 168 located in the passenger compartment of vehicle 10. In one application, the selectively movable element is a driver's selector shifter 168 selectively movable by the driver to positions corresponding with the modes of park, drive, neutral and reverse. Gear selector shifter 168 is operatively interconnected with sector plate 150 for rotating sector plate 150 between corresponding drive mode positions. As illustrated, gear select shaft 152 extends through an aperture in housing 30. At a distal end 160 of gear select shaft 152, a select lever 162 is fixedly connected for rotation therewith. At a free end 164, select lever 162 includes a pin 166 for receiving the first end of a flexible shift cable (not shown). The second end of the shift cable extends through the vehicle fire wall and is attached to selector shifter 168.

As the driver's selector shifter 168 is moved between its positions corresponding with park, reverse, neutral and drive, the shift cable either pushes or pulls on select lever 162 thereby rotating select lever 162, shift shaft 152 and ultimately sector plate 150 (shown in phantom in FIG. 6). More specifically, in the embodiment illustrated, when sector plate 150 is rotated to its park position, P, the shift cable is fully extended and select lever 162 is rotated counterclockwise (as shown in FIG. 6). As the driver moves selector shifter 168 from drive to reverse, the shift cable retracts, thereby rotating shift lever 162 and shift shaft 152 clockwise (as shown in FIG. 6). Similarly, additional retraction of the shift cable serves to rotate sector plate 150 to its neutral (N) and drive (D) positions. It will be appreciated by those skilled in the art, alternatively shift lever 162 may be actuated by electronic means (not shown) for an automatic shift arrangement.

Single speed transmission 20 further preferably comprises sensor means for sensing the position of sector plate 150 and generating a mode select signal indicative thereof. In the preferred embodiment of the present invention, the sensor means comprises a gear position switch 182 mounted adjacent sector plate 150. The sensor means further includes a printed circuit 180 attached to sector plate 150 which operates to open and close the contacts on gear position switch 182. The particular configuration of the printed data on printed circuit 180 may be of any suitable construction, the design of which is well known to those skilled in the art. Gear position switch 182 includes a plurality of pins (not shown) that extend from the bottom of gear position switch 182 and contact printed circuit 180 located on sector plate 150. In one application, the plurality of pins are four in number and are spring loaded for biased engagement with the printed circuit data. Deflection of the pins in the predetermined manner by the printed circuit 180 causes gear position switch 182 to generate the mode select signal.

Single speed transmission 20 of the present invention further comprises control means for receiving the mode select signal and generating a motor control signal in response thereto. In the preferred embodiment, the control means comprises a motor control unit 184 operable for controlling electric motor 18. In this regard, motor control unit 184 controls electric motor 18 to rotate in a first, or forward direction when motor control unit 184 receives a mode select signal indicative of rotation of sector plate 150 to its drive position. Analogously, motor control unit 184 controls electric motor 18 to rotate in a second, or reverse direction when motor control unit 184 receives a mode select signal indicative of rotation of sector plate 150 to its drive position. For example, if the driver shifts gear selector shifter 168 to reverse, sector plate 150 is rotated to its reverse position, a predetermined combination of pins are deflected by the printed circuit data. Gear position switch 182 subsequently generates the mode select signal for motor control unit 184 to drive electric motor 18 in reverse.

It will be appreciated by those skilled in the art, alternatively motor control unit 184 of vehicle 10 could be directed by signals generated directly from a manually operable switch (not shown) located in the passenger compartment. In this regard, rather than shifting of gear selector shifter 168 into a desired mode, the operator could alternatively activate a switch for the desired mode. The arrangement described in the preferred embodiment of the present invention as illustrated throughout the drawings serves to retain the traditional manner of shifting (e.g. manually through a gear selector shifter) to which drivers have become accustomed with conventional vehicles.

Figure 5:
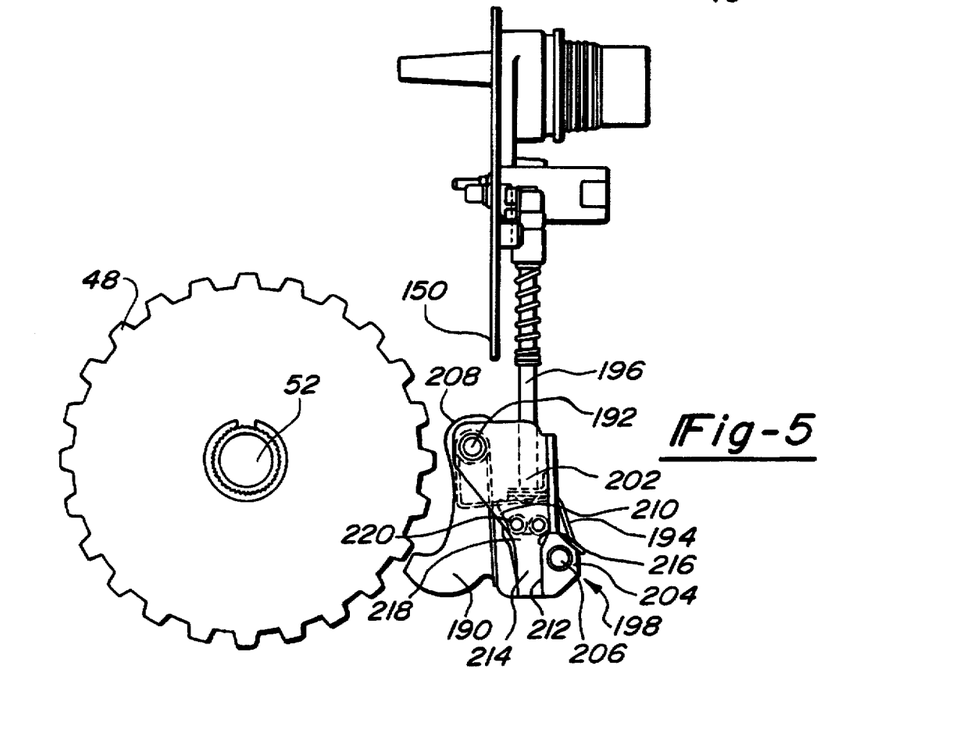
FIG. 5 is an end view of the parking sprag assembly of FIG. 3.

Referring now to FIGS. 3–5, the shift arrangement of the present invention is further illustrated to included a locking means for mechanically prohibiting rotation of axle shafts 26 and 28 when the park mode is selected. In the preferred embodiment, means for prohibiting rotation of axle shafts 26 and 28 is provided by a parking sprag arrangement which includes parking sprag gear 48. Parking sprag gear 48, which is mounted on the end of intermediate shaft 52, is adapted to be selectively locked by a pawl 190 pivotally located on a fixed pivot pin 192. Pawl 190 is spring loaded by a torsion spring 194 to normally remain spaced apart from the teeth of sprag gear 48. In one embodiment, sprag gear 48 includes 22 teeth. As will become more apparent immediately hereinafter, the parking sprag arrangement conveys rotational movement of sector plate 150 to linear displacement of parking rod 196 to move pawl 190 between a first position disengaged from sprag gear 48 (as shown in FIG. 5) and a second position engaged with sprag gear 48 (shown in FIG. 3).

Single speed transmission 20 of the present invention further comprises actuator means for automatically actuating said parking sprag arrangement to prohibit rotation of first and second axle shafts 26, 28 when the park mode is selected. In the preferred embodiment, the actuator means comprises sector plate 150. A first end 200 of parking rod 196 is pivotally attached to sector plate 150. A second end 202 of parking rod 196 extends into a parking sprag guide assembly 198. As sector plate 150 is rotated counterclockwise (as shown in FIG. 3) to park position, P, parking rod 190 further extends into parking sprag guide assembly 198. Guide assembly 198 includes a guide bracket 204 which is secured by fixed pivot pin 192 and an anchor shaft 206 which each extend into bores disposed in left hand portion 32 of housing 30 and cover 46 (as specifically shown in FIG. 4). Pawl 190 is pivotally attached for rotation at a proximal end 208 about pivot pin 192 and includes a ramped rear surface 210 which cooperates with an opposing surface 212 of guide bracket 204 to at least partially define a passage 214 into which second end 202 of parking rod 196 extends. Adjacent surface 212 of guide bracket 204 includes a ramped portion 216 disposed substantially adjacent to ramped rear surface 210. The opposing surfaces of pawl 190 and guide bracket 204 cooperate to define a tapered portion 218 of the passage 214.

Parking sprag guide assembly 198 further includes first and second drive rollers 220 adjacently disposed in tapered portion 218 of passage 214. As second end 202 of parking rod 196 extends further into parking sprag guide assembly 198, second end 202 of parking rod 196 engages drive rollers 220 forcing guide rollers 220 apart. Ramped rear surface 210 of pawl 190 acts as a camming surface and drive rollers 220 force pawl 190 to rotate clockwise (as shown in FIG. 5) about pivot pin 192.

The modes of drive, reverse, neutral and park are all obtained electrically in the preferred embodiment. Movement of sector plate 150 from the park position (P) of FIG. 4 to the drive position (D) occurs due to selective actuation of gear selector shifter 168 located in the passenger compartment into drive by the vehicle operator. The shift cable interconnecting gear selector shifter 168 and shift lever 162 mounted externally on housing 30 causes clockwise rotation of shift select shaft 152 and sector plate 150. Sector plate 150 is rotated until free end of spring located roller detent 156 engages the drive position (D) of sector plate 150.

Location of sector plate 150 in the drive position (D) aligns gear position switch 182 with the corresponding portion of printed circuit disposed on sector plate 150. Gear position switch 182 sends a signal to motor control unit 184 indicating the selected position—in this case drive (D). Specifically, electric motor 18 is enabled for counterclockwise rotation (as viewed from adjacent housing). In the drive position (D), the forward speed of the vehicle 10 can be controlled through the vehicle's throttle (not shown). As shown in FIG. 3, rotation of electric motor 18 causes input shaft 50 to rotate counterclockwise (see arrow A), intermediate shaft 52 to rotate clockwise (see arrow B) and left and right axle shafts to rotate counterclockwise (see arrow C).

Reverse motion of vehicle is analogously initiated by shifting of gear selector shifter into reverse and rotating sector plate 150 to its reverse position (R). Gear position switch 182 reads the corresponding portion of printed circuit and signals motor control unit 184 for appropriate rotation of electric motor 18 (as viewed from adjacent housing). No reverse gear is required in single speed transmission 20 inasmuch as reverse is accomplished by reversing the direction of rotation of electric motor 18.

Figure 8:
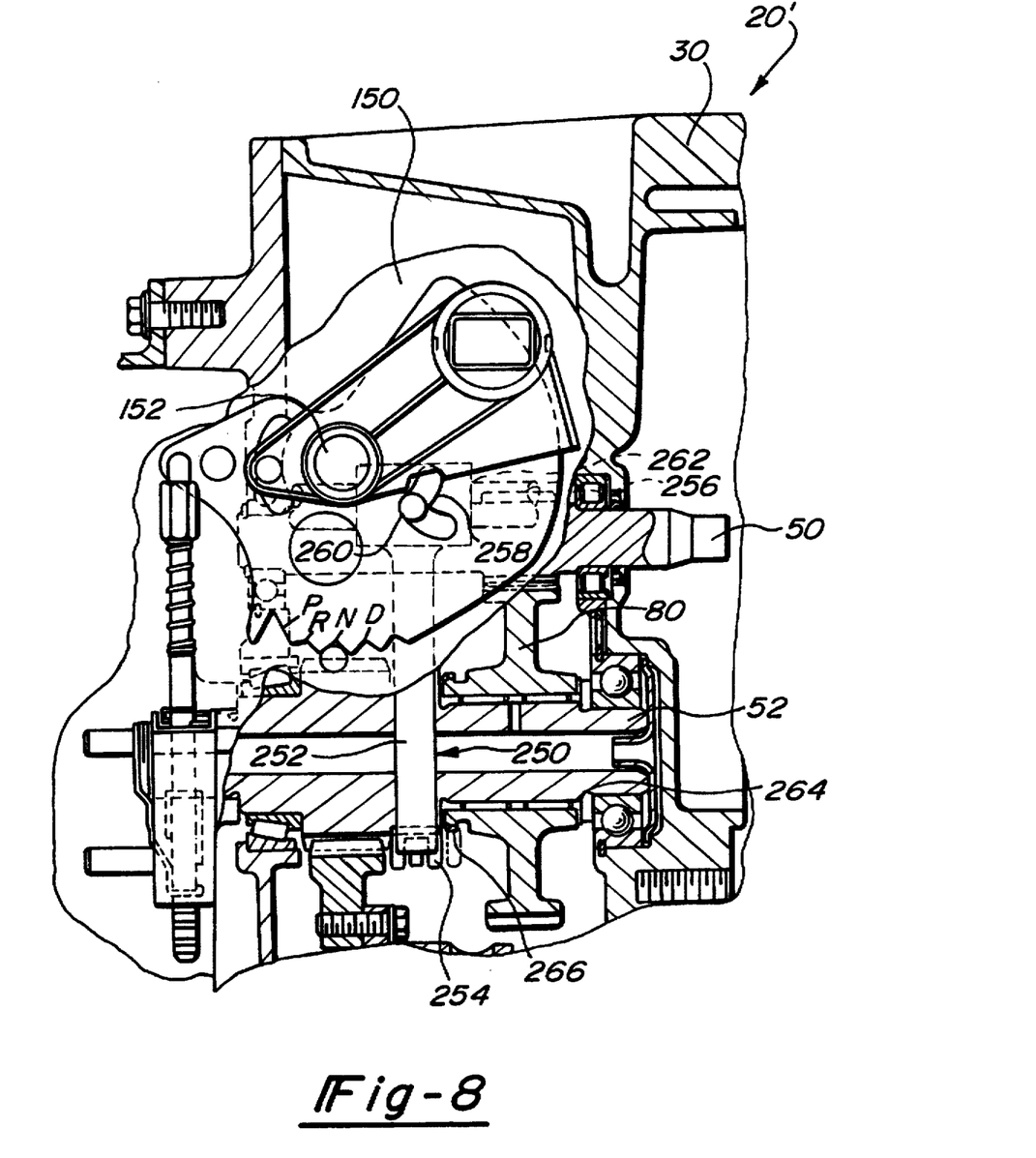
FIG. 8 is a developed sectional view of a power transfer system for an electric vehicle constructed in accordance with the teachings of a second preferred embodiment of the present invention.

Turning to FIG. 8, a second preferred embodiment of the present invention is illustrated. Common elements between the second preferred embodiment of FIG. 8 and the first preferred embodiment of FIGS. 1–7 have been indicated in the drawings with like reference numerals and need not be again described in detail. In general, the single speed transmission 20' of the second preferred embodiment departs from the first preferred embodiment in that it incorporates a mechanical neutral for mechanically disengaging intermediate shaft 52 from relative rotation with input shaft 50 when sector plate 150 is rotated to its neutral position.

Single speed transmission 20' further includes a transfer mechanism for selectively transmitting a source of drive torque from input shaft 50 to axle shafts 26, 28. In the preferred embodiment, the transfer mechanism includes intermediate shaft 52 and a shift fork assembly 250 for controlling the axial position of a shift fork 252. The transfer mechanism further includes shift means movable between a first position for disengaging input shaft 50 and axle shafts 26, 28 and preventing relative rotation therebetween, and a second position engaging input shaft 50 with axle shafts 26, 28 for establishing relative rotation therebetween. In one application, the shift means comprises a shift sleeve 254 mounted free to rotate an intermediate shaft 52, and axially movable between the first position (shown in sold lines in FIG. 8) and the second position (shown in phantom in FIG. 8). In addition, sector plate 150 is also interconnected to a shift fork assembly 250 for controlling the axle position of a shift fork 252 and, in turn, shift sleeve 254 in response to controlled rotation of sector plate 150'. Shift fork assembly 250 is supported for movement on a shift rail 256 (as shown in phantom) and is operatively interconnected with sector plate 150 such that selected rotation of sector plate 150 causes predetermined axial movement of shift sleeve 254. While not specifically shown, shift rail 256 includes opposite ends disposed in fore and aft sockets, respectively, formed in housing 30.

As discussed above, sector plate 150 may be rotated about an axis defined by shift select shaft 152 to any of four distinct positions as labeled "P", "R", "N", "D". As shown in FIG. 8, sector plate 150 is rotated to its neutral (N) position and input shaft 50 is disengage from rotation with intermediate shaft 52. Single speed transmission 20' further comprises coordination means for coordinating movement of shift sleeve 254 between the first and second positions in response to selective rotational movement of sector plate 150. Preferably, the coordination means operates such that shift sleeve 254 is in the first position when sector plate 150 is in the neutral position and shift sleeve 254 is in the second position when sector plate 150 is in either the drive position or the reverse position. In the exemplary embodiment illustrated, the coordination means further operates such that shift sleeve 254 is in the second position when sector plate 150 is in the park position.

In the preferred embodiment, the coordinating means comprises a contoured shift slot 258 formed therein into which a floating shift pin 260 extends. From FIG. 8, it can be seen that shift pin 260 is fixed to a bracket 262 of shift fork assembly 250 which is retained for sliding movement on shift rail 256. Shift slot 258 is configured to cause the desired translational movement of bracket 262, shift fork 252 and shift sleeve 254 in response to bi-directional rotation of sector plate 150.

In the second preferred embodiment of FIG. 8, intermediate gear 80 is rotatably supported on intermediate shaft 52 through roller bearings 264. As sector plate 150 is caused to rotate about the axis defined by shift select shaft 152 in a first direction (i.e., counterclockwise from the neutral position shown), the contour of the shift slot 258 causes axial displacement of shift fork assembly 250 toward intermediate gear 80. As such, when the driver moves selector shifter 168 (shown in FIG. 7) to its corresponding reverse or drive position, shift sleeve 254 engages teeth 266 formed on intermediate gear 78, thereby causing relative rotation between input shaft 50 and intermediate shaft 52.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to those skilled in the art upon a study of the drawings, specification and following claims:

What is claimed is:

1. A power transfer system for use in an electric vehicle for delivering torque from an electric power source to a pair of driven wheels, the power transfer system comprising:
   (i) a single variable speed electric motor; and
   (ii) a single speed transmission including:
      a housing;
      an input shaft mounted for rotation in said housing for receiving a source of torque from said electric motor, said input shaft having a first end extending from said housing, said first end of said input shaft engaging said variable speed electric motor;
      at least one output shaft mounted for rotation in said housing;
      an intermediate shaft supported for rotation in said housing between said input shaft and said at least one output shaft, said at least one output shaft being driven by said intermediate shaft;
      a drive mechanism mounted in said housing for movement between a park position, a drive position, a neutral position and a reverse position, said drive mechanism including a rotatable sector plate;
      mode select means for enabling a vehicle operator to select one of a park mode, reverse mode, neutral mode, and drive mode, said mode select means operative to cause selective movement of said drive mechanism such that said drive mechanism moves to said park position when said park mode is selected, said drive mechanism moves to said drive position when said drive mode is selected, said drive mechanism moves to said neutral position when said neutral mode is selected, and said drive mechanism moves to said reverse position when said reverse mode is selected;
      sensor means for sensing the position of said drive mechanism, said sensor means being operable for generating a mode select signal indicative of the position of said drive mechanism, said sensor means for sensing the position of said drive mechanism includes a printed circuit disposed on said sector plate and a switch operatively associate with said printed circuit; and
      control means for receiving said mode select signal and generating a motor control signal in response thereto for controlling said electric motor such that said motor control signal controls said electric motor to produce an output torque for rotating said input shaft in a first direction when said drive mechanism is in said drive position and in a second direction opposite to said first direction when said drive mechanism is in said reverse position.

2. The power transfer system of claim 1, further comprising a differential arrangement, and further wherein said at least one output shaft comprises first and second axle shafts interconnected to said intermediate shaft through said differential arrangement.

3. The power transfer system of claim 2, wherein said input shaft includes an input gear, said intermediate shaft includes an intermediate gear in meshing relation with said input gear and an output gear, and said differential arrangement includes a final drive gear in meshing relation with a said output gear.

4. The power transfer system of claim 3, wherein the said input gear and said intermediate gear are in constant meshing relationship.

5. The power transfer system of claim 4, wherein said output gear and said final drive gear are in constant meshing relationship.

6. The power transfer system of claim 1, further comprising locking means for selectively prohibiting rotation of said at least one output shaft, said locking means being interconnected to said drive mechanism such that movement of said drive mechanism to said park position operates to prohibit rotation of said at least one output shaft, said locking means comprising a parking sprag arrangement and actuator means mounted in said housing and operative for selectively moving said parking sprag arrangement between a locked mode and an unlocked mode such that said parking sprag arrangement is in said locked mode when said park mode is selected.

7. The power transfer system of claim 6, wherein said actuator means comprises a contoured shift slot located in said sector plate.

8. The power transfer system of claim 7, wherein said parking sprag arrangement comprises a parking sprag gear fixedly secured to an end of said intermediate shaft.

9. A power transfer system for use in an electric vehicle for delivering torque from an electric power source to a pair of driven wheels, the power transfer system comprising:
 a variable speed electric motor; and
 a single speed transmission including:
  (i) a housing;
  (ii) an input shaft mounted for rotation in said housing for receiving a source of torque from said electric motor;
  (iii) output means;
  (iv) a drive mechanism including a rotatable sector plate mounted in said housing for movement between a park position, a drive position, a neutral position and a reverse position;
  (v) mode select means for enabling a vehicle operator to select one of a park mode, drive mode, neutral mode, and reverse mode, said mode select means operative to cause selective movement of said drive mechanism such that such that said drive mechanism moves to said park position when said park mode is selected, said drive mechanism moves to said drive position when said drive mode is selected, said drive mechanism moves to said neutral position when said neutral mode is selected and said drive mechanism moves to said reverse position when said reverse mode is selected;
  (vi) a transfer mechanism for selectively transmitting said source of drive torque from said input shaft to said at least one output shaft, said transfer mechanism including a shift sleeve moveable between a first position disengaging said input shaft and said output shaft and preventing relative rotation therebetween, and a second position engaging said input shaft and said output shaft for establishing relative rotation therebetween;
  (vii) coordinating means including a contour shift slot in said sector plate and a shift fork arrangement, said shift fork arrangement being operatively interconnected with said sector plate through a floating pin extending through said contour shift slot, said contour shift slot operative for converting rotational movement of said sector plate to axial movement of said shift fork arrangement and configured such that said shift sleeve is in said first position when said drive mechanism is in said neutral position, and said shift sleeve is in said second position when said drive mechanism is in one of said drive position and said reverse position;
  (viii) sensor means for sensing the position of said drive mechanism, said sensor means being operable for generating a mode select signal indicative of the position of said drive mechanism, said sensor means for sensing the position of said drive mechanism includes a printed circuit disposed on said sector plate and a switch operatively associate with said printed circuit; and
  (ix) control means for receiving said mode select signal and generating a motor control signal in response thereto for controlling said electric motor such that said motor control signal controls said electric motor to produce an output torque for rotating said input shaft in a first direction when said drive mechanism is in said drive position and in a second direction opposite to said first direction when said drive mechanism is in said reverse position.

10. The power transfer system of claim 9 wherein said transfer mechanism further comprises an intermediate shaft, said shift sleeve mounted free to rotate on said intermediate shaft and being axially moveable on said intermediate shaft between said first position and said second position.

11. The power transfer system of claim 9, further comprising locking means for mechanically prohibiting rotation of said output means when said park mode is selected.

12. A single speed transmission for delivering torque from a variable speed electric motor to a pair of driven wheels of a motor vehicle, the single speed transmission comprising:
 a housing;
 an input shaft mounted for rotation in said housing for receiving a source of torque from the variable speed electric motor;
 at least one output shaft mounted for rotation in said housing and driven by said input shaft;
 a drive mechanism mounted in said housing for movement between a drive position and a reverse position, said drive mechanism including a rotatable sector plate;
 mode select means for enabling a vehicle operator to select one of a reverse mode and a drive mode, said mode select means operative to cause selective movement of said drive mechanism such that said drive mechanism moves to said drive position when said drive mode is selected and said drive mechanism moves to said reverse position when said reverse mode is selected;
 sensor means for sensing the position of said drive mechanism, said sensor means being operable for generating a mode select signal indicative of the position of said drive mechanism, said sensor means for sensing the position of said drive mechanism includes a printed circuit disposed on said sector plate and a switch operatively associate with said printed circuit; and
 control means for receiving said output and controlling the variable speed electric motor to produce an output torque for rotating said input shaft.

13. The single speed transmission of claim 12, further comprising an intermediate shaft supported for rotation in said housing between said input shaft and said at least one output shaft.

14. The single speed transmission of claim 12, wherein said driven mechanism is mounted for movement between a neutral position and a park position, and further wherein said mode select means enables said vehicle operator to select one of a park mode and a neutral mode such that said drive mechanism moves to said neutral position when said neutral mode is selected and said drive mechanism moves to said park position when said park mode is selected.

15. The single speed transmission of claim 12, wherein said control means is operative for receiving said mode select signal and generating a motor control signal in response thereto for controlling said variable speed electric motor such that said motor control signal controls said variable speed electric motor to produce an output torque for rotating said input shaft.

16. The single speed transmission of claim 15, wherein said motor control signal is operative to control said variable speed electric motor such that said variable speed electric motor produces an output torque for rotating said input shaft in a first direction when said drive mechanism is in said drive position and in a second direction opposite to said first direction when said drive mechanism is in said reverse position.

17. The single speed transmission of claim 13, wherein said at least one output shaft comprises first and second axle shafts.

18. The single speed transmission of claim 17, wherein said first and second axle shafts are operatively interconnected to said intermediate shaft through a differential assembly.

19. The single speed transmission of claim 18, wherein said input shaft includes an input gear, said intermediate shaft includes an intermediate gear mounted in meshing relation with said input gear and an output gear, and said differential assembly includes a final drive gear in meshing relation with said output gear.

20. The single speed transmission of claim 19, wherein the said input gear and said intermediate gear are in constant meshing relationship.

21. The single speed transmission of claim 19, wherein said output gear and said final drive gear are in constant meshing relationship.

22. The single speed transmission of claim 17, further comprising locking means for selectively mechanically prohibiting rotation of said first and second axle shafts.

23. The single speed transmission of claim 22, wherein said locking means comprises a parking sprag arrangement and actuator means for automatically actuating said parking sprag arrangement.

\* \* \* \* \*